(12) United States Patent
Wang et al.

(10) Patent No.: US 11,305,183 B2
(45) Date of Patent: Apr. 19, 2022

(54) METHOD AND APPARATUS FOR TACTILE SIGNAL GENERATION AND COMPUTER DEVICE

(71) Applicant: AAC Technologies Pte. Ltd., Singapore (SG)

(72) Inventors: Xiuyue Wang, Shenzhen (CN); Jianqi Li, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 121 days.

(21) Appl. No.: 16/945,950

(22) Filed: Aug. 3, 2020

(65) Prior Publication Data

US 2020/0406132 A1 Dec. 31, 2020

Related U.S. Application Data

(63) Continuation of application No. PCT/CN2019/093900, filed on Jun. 28, 2019.

(51) Int. Cl.
| | |
|---|---|
| *A63F 13/285* | (2014.01) |
| *A63F 13/577* | (2014.01) |
| *A63F 13/837* | (2014.01) |
| *G06F 3/01* | (2006.01) |
| *G08B 6/00* | (2006.01) |

(52) U.S. Cl.
CPC ......... *A63F 13/285* (2014.09); *A63F 13/577* (2014.09); *A63F 13/837* (2014.09); *G06F 3/016* (2013.01); *G08B 6/00* (2013.01); *A63F 2300/1037* (2013.01)

(58) Field of Classification Search
CPC .... A63F 13/285; A63F 13/577; A63F 13/837; A63F 2300/1037; G06F 3/016; G08B 6/00
USPC .......................................................... 463/30
See application file for complete search history.

(56) References Cited

U.S. PATENT DOCUMENTS

| | | | |
|---|---|---|---|
| 9,449,476 B2 * | 9/2016 | Lynn | G06F 3/0416 |
| 9,558,637 B2 * | 1/2017 | Heubel | G08B 6/00 |
| 9,858,751 B2 * | 1/2018 | Bytnar | G07F 17/3209 |
| 9,880,621 B2 * | 1/2018 | Israr | G06F 3/016 |
| 10,310,804 B2 * | 6/2019 | Keller | G06F 3/165 |
| 10,394,328 B2 * | 8/2019 | Kang | G06F 3/04842 |
| 10,449,445 B2 * | 10/2019 | Brav | G06F 3/011 |
| 2016/0246378 A1 * | 8/2016 | Sampanes | G06F 3/016 |

* cited by examiner

*Primary Examiner* — Allen Chan
(74) *Attorney, Agent, or Firm* — W&G Law Group

(57) ABSTRACT

The embodiments of the present invention provide a method and an apparatus for tactile signal generation, and a computer device. The method includes: obtaining target scene tactile information, the target scene tactile information including a target scene category and a target tactile sensation category corresponding to the target scene category; obtaining a basic frequency band tactile signal set corresponding to the target scene category, the basic frequency band tactile signal set including a plurality of basic frequency band tactile signals, and generating a target tactile signal based on the target tactile sensation category and the basic frequency band tactile signal set. In this way, the generation of the tactile sensation can be more flexible and diverse.

10 Claims, 6 Drawing Sheets

METHOD AND APPARATUS FOR TACTILE SIGNAL GENERATION AND COMPUTER DEVICE

TECHNICAL FIELD

The present invention relates to the field of game technology, and more particularly, to a method and an apparatus for tactile signal generation, and a computer device.

BACKGROUND

Most currently available games, such as action, adventure, simulation, role-playing, leisure, and other categories of games, generally focus on visual and audible interactions, without intuitive tactile experience. If stimulation of tactile sensations can be added to the games, immersive experiences for players can be enhanced and different reality experiences can be provided for different scenes, different game categories, and different roles.

Although there are few available games that have tactile effects added, the preset tactile effects are very limited and cannot satisfy the diverse tactile needs of dynamic scenes.

Therefore, it is desired to provide a method capable of generating tactile signals having various tactile effects flexibly.

SUMMARY

It is an object of the present invention to provide a method and an apparatus for tactile signal generation, and a computer device, capable of generating tactile signals having various tactile effects flexibly.

In an embodiment, a method for tactile signal generation is provided. The method includes: obtaining target scene tactile information, the target scene tactile information including a target scene category and a target tactile sensation category corresponding to the target scene category; obtaining a basic frequency band tactile signal set corresponding to the target scene category, the basic frequency band tactile signal set including a plurality of basic frequency band tactile signals, and generating a target tactile signal based on the target tactile sensation category and the basic frequency band tactile signal set.

In an embodiment, an apparatus for tactile signal generation is provided. The apparatus includes: a first obtaining module configured to obtain target scene tactile information, the target scene tactile information including a target scene category and a target tactile sensation category corresponding to the target scene category; a second obtaining module configured to obtain a basic frequency band tactile signal set corresponding to the target scene category, the basic frequency band tactile signal set including a plurality of basic frequency band tactile signals, and a tactile sensation generating module configured to generate a target tactile signal based on the target tactile sensation category and the basic frequency band tactile signal set.

In an embodiment, a computer device is provided. The computer device includes a memory and a processor. The memory stores a computer program which, when executable by the processor, causes the processor to: obtain target scene tactile information, the target scene tactile information including a target scene category and a target tactile sensation category corresponding to the target scene category; obtain a basic frequency band tactile signal set corresponding to the target scene category, the basic frequency band tactile signal set including a plurality of basic frequency band tactile signals, and generate a target tactile signal based on the target tactile sensation category and the basic frequency band tactile signal set.

In an embodiment, a computer readable storage medium is provided. The computer readable storage medium stores a computer program which, when executed by a processor, causes the processor to: obtain target scene tactile information, the target scene tactile information including a target scene category and a target tactile sensation category corresponding to the target scene category; obtain a basic frequency band tactile signal set corresponding to the target scene category, the basic frequency band tactile signal set including a plurality of basic frequency band tactile signals, and generate a target tactile signal based on the target tactile sensation category and the basic frequency band tactile signal set.

The present invention has advantageous effects in that the present invention provides a method and an apparatus for tactile signal generation, and a computer device. First, target scene tactile information is obtained. The target scene tactile information includes a target scene category and a target tactile sensation category corresponding to the target scene category. Then, a basic frequency band tactile signal set corresponding to the target scene category is obtained. The basic frequency band tactile signal set includes a plurality of basic frequency band tactile signals. Finally, a target tactile signal is generated based on the target tactile sensation category and the basic frequency band tactile signal set. It can be seen that, in this way, since the basic frequency band tactile signal set is obtained and the basic frequency band tactile signal set includes at least one basic frequency band tactile signal corresponding to the target scene category, a target tactile sensation can be generated based on the target tactile sensation category and the basic frequency band tactile signal set, such that the generation of the target tactile sensation can be more flexible and diverse, without having to rely on a few pre-stored tactile sensations. Further, compared with a few pre-stored tactile sensations, more target tactile sensations can be provided. Meanwhile, as only basic frequency band tactile signals need to be stored, the storage space can also be reduced to some extent.

BRIEF DESCRIPTION OF DRAWINGS

In order to explain the embodiments of the present invention or the technical solutions in the prior art more clearly, the drawings used in the description of the embodiments or the prior art will be briefly introduced in the following. Obviously, the drawings in the following description are only some of the embodiments of the present invention. For those of ordinary skill in the art, other drawings can be obtained based on these drawings without any inventive efforts.

DESCRIPTION OF EMBODIMENTS

The present invention will be further described below with reference to the accompanying drawings and embodiments. Obviously, the described embodiments are only a part of the embodiments of the present invention, but not all the embodiments. All other embodiments obtained by those having ordinary skill in the art based on the embodiments of the present invention, without inventive efforts, fall within the scope of the present invention.

Figure 1:
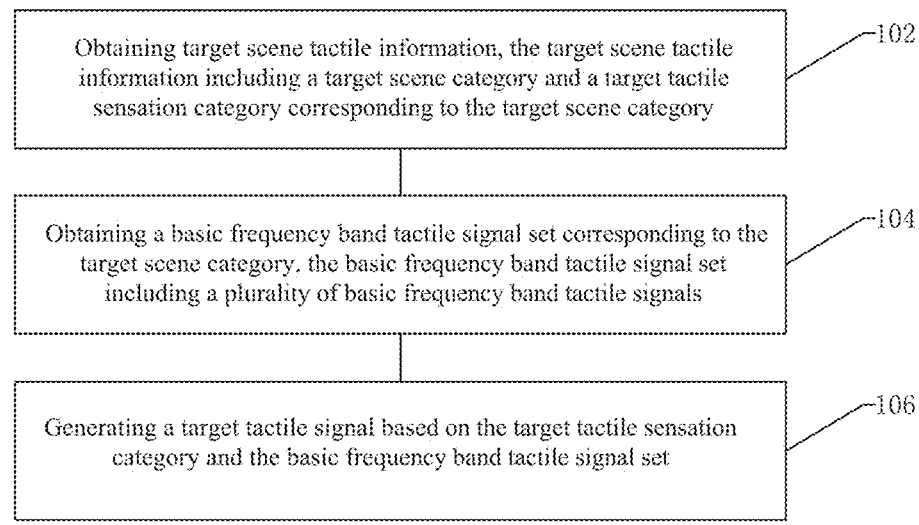
FIG. 1 is a schematic diagram showing an implementation process of a method for tactile signal generation according to an embodiment.

As shown in FIG. 1, in an embodiment, a method for tactile signal generation is provided. The method for tactile signal generation according to the embodiment of the present invention can be performed by an apparatus capable of implementing the method for tactile signal generation according to the embodiment of the present invention. The apparatus may include, but not limited to, a server or a terminal. Here, the server may include, but not limited to, a high-performance computer and a high-performance computer cluster. The terminal may include, but not limited to, a mobile terminal, a tablet terminal, a notebook computer terminal, and a desktop computer terminal. The method for tactile signal generation includes the following steps.

At step 102, target scene tactile information is obtained. The target scene tactile information includes a target scene category and a target tactile sensation category corresponding to the target scene category.

Here, the target scene category is used to indicate a large scene corresponding to a tactile sensation in a current game. For example, in the PLAYER UNKNOWN' S BATTLE GROUNDS game, the scene category may include a driving category, a walking category, a running category, and a swimming category. The target tactile sensation category reflects a category of tactile sensation required for a specific operation for the target scene category. For example, the target tactile sensation category corresponding to the driving category may include a constant-speed driving category, a bumping category, a uniform acceleration driving category, a uniform deceleration driving category, and a drifting category.

At step 104, a basic frequency band tactile signal set corresponding to the target scene category is obtained. The basic frequency band tactile signal set includes a plurality of basic frequency band tactile signals.

A tactile signal is a signal that can provide a tactile sensation, including a vibration-type signal, such as a sine wave signal and a white noise signal. A basic frequency band tactile signal is a tactile signal at a frequency band. The size of the frequency band may depend on specific application scenarios and specific requirements. Basic frequency band tactile signal sets corresponding to different scene categories can be preconfigured in the entity performing the method for tactile signal generation.

At step 106, a target tactile signal is generated based on the target tactile sensation category and the basic frequency band tactile signal set.

In an embodiment, the respective basic frequency band tactile signals in the basic frequency band tactile signal set can be combined to obtain the target tactile signal. In particular, the step 106 of generating the target tactile signal based on the target tactile sensation category and the basic frequency band tactile signal set may include the following steps.

At step 106a, a combination position for each basic frequency band tactile signal in the basic frequency band tactile signal set is determined based on the target tactile sensation category.

Here, the combination position reflects the position of the basic frequency band tactile signal in the target tactile signal.

Since different tactile sensation categories require different tactile sensations, it is desired to place different basic frequency band tactile signals at different combination positions to provide different tactile sensations. It can be appreciated that even for the same basic frequency band tactile signals, different tactile signals and the resulting tactile sensations can be obtained with different combination positions of the basic frequency band tactile signals in the target tactile signal.

At step 106b, the basic frequency band tactile signals in the basic frequency band tactile signal set are combined in accordance with their respective combination positions to generate the target tactile signal.

For example, there are four basic frequency band tactile signals in the basic frequency band tactile signal set, m, n, l, and p, and the combination positions of m, n, l, and p are 2, 1, 4, and 3, respectively. In this case, the frequency band tactile signal m is placed at the combination position 2, the basic frequency band tactile signal n is placed at the combination position 1, the basic frequency band tactile signal l is placed at the combination position 4, and the basic frequency band tactile signal p is placed at the combination position 3. The resulting target tactile signal is nmpl.

In an embodiment, some of the basic frequency band tactile signals in the basic frequency band tactile signal set can be combined to obtain the target tactile signal. In particular, the step 106 of generating the target tactile signal based on the target tactile sensation category and the basic frequency band tactile signal set may include the following steps.

At step 106A, target basic frequency band tactile signals corresponding to the target tactile sensation category are obtained from the basic frequency band tactile signal set.

Figure 2:
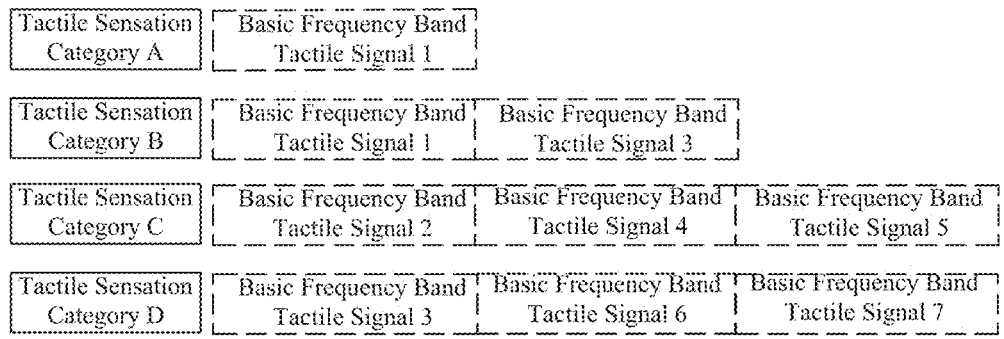
FIG. 2 is a schematic diagram showing a correspondence between tactile sensation categories and basic frequency band tactile signals according to an embodiment.

In an embodiment, the entity performing the method for tactile signal generation can store the correspondence between tactile sensation categories and basic frequency band tactile signals, as shown in FIG. 2. According to the correspondence, the basic frequency band tactile signals corresponding to the tactile sensation category can be quickly obtained.

In an embodiment, a number of basic frequency band tactile signals to be obtained can be determined based on the target tactile sensation category, so as to obtain the target basic frequency band tactile signals. For example, when the target tactile sensation category is a constant-speed driving category, the number of basic frequency band tactile signals can be determined to be 1, such that one target basic frequency band tactile signal can be obtained. As another example, when the target tactile sensation category is a bumping category, the number of basic frequency band tactile signals can be determined to be greater than or equal to 2, such that at least two target basic frequency band tactile signals can be obtained.

In an embodiment, the method may further include: obtaining level attribute information corresponding to the target tactile sensation category. The step 106A of obtaining the target basic frequency band tactile signals corresponding to the target tactile sensation category from the basic frequency band tactile signal set may include: obtaining the one or more target basic frequency band tactile signals corresponding to the target tactile sensation category and the level attribute information from the basic frequency band tactile signal set.

Here, the level attribute information reflects the amplitudes of the basic frequency band tactile signals. For example, when the target tactile sensation category is a constant-speed driving category in the driving category, different driving speeds may bring different tactile sensations. Therefore, when the target tactile sensation category is the constant-speed driving category, the level attribute information reflects the level of the driving speed. In this case, a "driver" will move at a constant speed corresponding to the level attribute information. As an example, target basic frequency band tactile sub-signals having different amplitudes corresponding to the target basic frequency band tactile signals are included in the basic frequency band tactile signal set, so that the corresponding target basic frequency band tactile signal can be obtained according to the level attribute information. For example, the target basic frequency band tactile signal is a, and the target basic frequency band tactile sub-signals having different amplitudes are a1, a2, and a3, respectively. According to the level attribute information, the corresponding target basic frequency band tactile sub-signal is determined to be a3, so the target tactile signal is determined as a3a3 . . . a3, so as to obtain a constant-speed tactile experience at different speeds.

At step 106B, a combination mode for the target basic frequency band tactile signals is determined based on the target tactile sensation category.

Since the tactile sensations brought by different tactile categories will be different, the combination mode for the target basic frequency band tactile signals will be different for different tactile sensations. The apparatus performing the method for tactile signal generation may be provided with a correspondence between tactile sensation categories and combination modes. For example, for a constant-speed driving category, a combination mode can be to repeatedly combine one target basic frequency band tactile signal multiple times, e.g., the combination mode may be aaa. For the bumping category, two target basic frequency band tactile signals having same amplitudes can be combined to obtain a combined signal, and then the combined signal can be repeated multiple times, e.g., the combination mode may be ababab, where the amplitudes of a and b can be same or different.

At step 106C, the target basic frequency band tactile signals are combined in accordance with the combination mode to obtain the target tactile signal.

According to the above-described method for tactile signal generation, first, target scene tactile information is obtained. The target scene tactile information includes a target scene category and a target tactile sensation category corresponding to the target scene category. Then, a basic frequency band tactile signal set corresponding to the target scene category is obtained. The basic frequency band tactile signal set includes a plurality of basic frequency band tactile signals. Finally, a target tactile signal is generated based on the target tactile sensation category and the basic frequency band tactile signal set. It can be seen that, in this way, since the basic frequency band tactile signal set is obtained and the basic frequency band tactile signal set includes at least one basic frequency band tactile signal corresponding to the target scene category, a target tactile sensation can be generated based on the target tactile sensation category and the basic frequency band tactile signal set, such that the generation of the target tactile sensation can be more flexible and diverse, without having to rely on a few pre-stored tactile sensations. Further, compared with a few pre-stored tactile sensations, more target tactile sensations can be provided. Meanwhile, as only basic frequency band tactile signals need to be stored, the storage space can also be reduced to some extent.

In an embodiment, the combination mode may include a first combination mode in which basic frequency band tactile signals having same amplitudes are combined. The step 106C of combining the target basic frequency band tactile signals in accordance with the combination mode to obtain the target tactile signal may include a step 106C1 of combining target basic frequency band tactile signals having same amplitudes in the first combination mode to obtain the target tactile signal. The target basic frequency band tactile signals having the same amplitudes are combined. This combination mode is suitable for a constant-speed driving scene, such as moving at a constant speed.

Here, the amplitude reflects the level of the tactile signal. For example, when the sound is loud, the signal amplitude is large; and when the sound is low, the signal amplitude is small. In the embodiment of the present invention, the amplitudes of the tactile signals having different amplitudes normalized with respect to one and the same standard are considered to be the same amplitudes. For example, for the audio of music, if the audio is normalized with respect to one and the same standard, although after normalization the audio waveform signal has high portions and low portions, and the corresponding loudness of the sound may vary, but it still has the same amplitude.

In an embodiment, the first combination mode may include a single-signal single-amplitude mode in which a plurality of same basic frequency band tactile signals are combined. The step 1061C of combining the target basic frequency band tactile signals having the same amplitudes in the first combination mode to obtain the target tactile signal may include: combining a plurality of same target basic frequency band tactile signals in the single-signal single-amplitude mode to obtain the target tactile signal. Here, in the single-signal single-amplitude mode, there is only one target basic frequency band tactile signal, which is replicated multiple times to obtain a plurality of identical target basic frequency band tactile signals.

Figure 3:
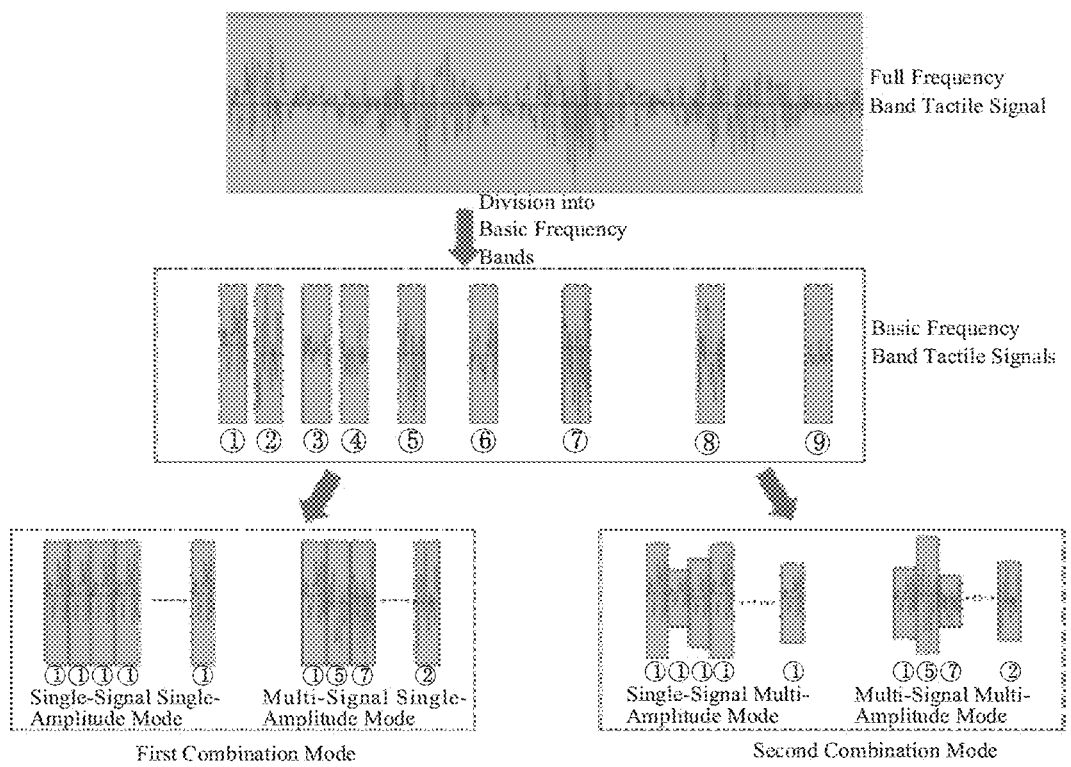
FIG. 3 is a schematic diagram showing a division of a full frequency band tactile signal and combination modes of a basic frequency band tactile signals according to an embodiment.

For example, one single target basic frequency band tactile signal can be a, and a can be replicated multiple times to obtain a plurality of same basic frequency band tactile signals, aa . . . a, as in the single-signal single-amplitude mode shown in FIG. 3. The single-signal single-amplitude mode can be applied to a constant-speed driving category, such that the vibration intensity of the vehicle engine will remain unchanged, and the vibration sensation brought to the user will be maintained at the same vibration intensity.

In an embodiment, the first combination mode may include a multi-signal single-amplitude mode in which a plurality of basic frequency band tactile signals having same amplitudes are combined. The step 1061C of combining the target basic frequency band tactile signals having the same amplitudes in the first combination mode to obtain the target tactile signal may include: combining a plurality of target basic frequency band tactile signals having same amplitudes in the multi-signal single-amplitude mode to obtain the target tactile signal.

Here, the plurality of target basic frequency band tactile signals having the same amplitudes are a plurality of different target basic frequency band tactile signals having the same amplitudes.

For example, a plurality of target basic frequency band tactile signals having the same amplitudes can be directly combined to obtain the target tactile signal. In particular, the step of combining the plurality of target basic frequency band tactile signals having same amplitudes in the multi-signal single-amplitude mode to obtain the target tactile signal may include: obtaining a multi-signal single-amplitude set from the plurality of target basic frequency band tactile signals having the same amplitudes; and combining the plurality of target basic frequency band tactile signals in the multi-signal single-amplitude set in the multi-signal single-amplitude mode to obtain the target tactile signal.

For example, a plurality of target basic frequency band tactile signals having the same amplitudes can be tactile signals 1, 2, and 3, and the target tactile signal is 132, as in the multi-signal single-amplitude mode shown in FIG. 3.

For example, a plurality of target basic frequency band tactile signals having the same amplitudes can be combined and then repeated to obtain the target tactile signal. In particular, the step of combining the plurality of target basic frequency band tactile signals having same amplitudes in the multi-signal single-amplitude mode to obtain the target tactile signal may include: obtaining a multi-signal single-amplitude set from the plurality of target basic frequency band tactile signals having the same amplitudes; combining the plurality of target basic frequency band tactile signals in the multi-signal single-amplitude set to obtain a first repetition signal; combining at least one first repetition signal to obtain the target tactile signal.

For example, a plurality of target basic frequency band tactile signals having the same amplitudes can be 1, 2, and 3, the first repetition signal can be 132, and the target tactile signal can be 132132132.

The multi-signal single-amplitude mode can be applied to a bumping category.

When a vehicle is moving on a gravel road, the bumpy vibration sensation provides the tactile effect with no change in frequency.

The method for tactile signal generation according to the embodiment of the present invention achieves a tactile effect and tactile effects of different durations by combining different numbers of basic frequency band tactile signal sets and repeating the combination.

In an embodiment, the combination mode may include a second combination mode in which basic frequency band tactile signals having different amplitudes are combined. The step 106C of combining the target basic frequency band tactile signals in accordance with the combination mode to obtain the target tactile signal may include a step 106C2 of combining target basic frequency band tactile signals having different amplitudes in the second combination mode to obtain the target tactile signal.

In an embodiment, the second combination mode may include a single-signal multi-amplitude mode in which single basic frequency band tactile signals having different amplitudes are combined. The step 106C2 of combining the target basic frequency band tactile signals having the different amplitudes in the second combination mode to obtain the target tactile signal may include: changing a signal amplitude of the single target basic frequency band tactile signal to obtain a single-signal multi-amplitude set including tactile signals having different signal amplitudes; and obtaining the target tactile signal based on the single-signal multi-amplitude mode and the single-signal multi-amplitude set.

The single-signal multi-amplitude mode means a mode of generating a plurality of tactile signals having different amplitudes based on one basic frequency band tactile signal, thereby obtaining a single-signal multi-amplitude set.

For example, a target basic frequency band tactile signal may be a, a plurality of tactile signals, a1, a2, and a3, having different amplitudes can be obtained based on a, and a single-signal multi-amplitude set can be [a1, a2, a3]. The tactile signals in the single-signal multi-amplitude set can be combined in the single-signal multi-amplitude mode to obtain the target tactile signal of a1a3a2.

The signal amplitude of the basic frequency band tactile signal can be achieved according to any of the following two schemes. Scheme 1 relates to changing a normalization standard. Since the amplitudes of the signals obtained based on the same normalization standard are the same, signals having different amplitudes can be obtained by changing the normalization standard. Scheme 2 relates to proportional scaling. By proportionally scaling a vibration signal, the amplitude ca be changed.

For example, the respective tactile signals in the single-signal multi-amplitude set can be directly combined. In particular, the step of obtaining the target tactile signal based on the single-signal multi-amplitude mode and the single-signal multi-amplitude set may include: combining the respective tactile signals in the single-signal multi-amplitude set in the single-signal multi-amplitude mode to obtain the target tactile signal.

For example, the single-signal multi-amplitude set may be [a1, a2, a3], and the target tactile signal may be a1a2a3 or a2a1a3, as in the single-signal multi-amplitude mode shown in FIG. 3.

For example, the step of obtaining the target tactile signal based on the single-signal multi-amplitude mode and the single-signal multi-amplitude set may include: combining the respective tactile signals in the single-signal multi-amplitude set to obtain a second repetition signal; and combining at least one second repetition signal in the single-signal multi-amplitude mode to obtain the target tactile signal.

For example, the single signal multiple amplitude set may be [a1, a2, a3], the second repetition signal is a1a2a3 or a2a1a3, and the target tactile signal may be a1a2a3a1a2a3 or a2a1a3a2a1a3.

The single-signal multi-amplitude mode can be applied to a uniform acceleration (deceleration) driving category. The acceleration of the vehicle engine does not change, but the engine speed continues to increase (or decrease), which provides the user with steady changes in vibration sensations, but the frequency characteristics of the tactile sensations do not change.

In an embodiment, the second combination mode may include a multi-signal multi-amplitude mode in which a plurality of basic frequency band tactile signals having different amplitudes are combined after the amplitudes have been changed. The step 106C2 of combining the target basic frequency band tactile signals having the different amplitudes in the second combination mode to obtain the target tactile signal may include: changing the signal amplitude of each target basic frequency band tactile signal to obtain a multi-signal multi-amplitude set including tactile signals corresponding to the respective target basic frequency band tactile signals and having their respective signal amplitudes changed; and obtaining the target tactile signal based on the multi-signal multi-amplitude mode and the respective basic frequency band tactile signals in the multi-signal multi-amplitude set. The multi-signal multi-amplitude mode is a mode in which the respective amplitudes of the plurality of basic frequency band tactile signals having different amplitudes are changed and then combined.

The multi-signal and multi-amplitude set stores the basic frequency band tactile signals having their respective signal amplitudes changed. For example, the target basic frequency band tactile signals may be a, b, and c, and the respective amplitudes of a, b, and c may be changed to obtain a1, b1, and c1, thereby obtaining a multi-signal multi-amplitude set [a1, b1, c1].

For example, the step of obtaining the target tactile signal based on the multi-signal multi-amplitude mode and the respective basic frequency band tactile signals in the multi-signal multi-amplitude set may include: combining the respective basic frequency band tactile signals in the multi-signal multi-amplitude set in the multi-signal multi-amplitude mode to obtain the target tactile signal.

For example, the multi-signal multi-amplitude set may be [a1, b1, c1], a1, b1, and c1 can be combined to obtain the target tactile signal a1a3a2, as in the multi-signal multi-amplitude mode shown in FIG. 3.

For example, the step of obtaining the target tactile signal based on the multi-signal multi-amplitude mode and the respective basic frequency band tactile signals in the multi-signal multi-amplitude set may include: combining the respective basic frequency band tactile signals in the multi-signal multi-amplitude set to obtain a third repetition signal; and combining at least one third repetition signal in the multi-signal multi-amplitude mode to obtain the target tactile signal.

For example, the multi-signal multi-amplitude set may be [a1, b1, c1], a1, b1, and c1 can be combined to obtain a third repetition signal a1a3a2, and the target tactile signal may be a1a3a2a1a3a2a1a3a2.

The multi-signal and multi-amplitude mode can be applied to a drifting category. The speed and acceleration of the vehicle engine both change non-uniformly, providing the user with a vibration sensation effect having varying frequency characteristics and intensities.

In an embodiment, the combination mode may include a third combination mode determined based on the first combination mode and the second combination mode. The step 106C of combining the target basic frequency band tactile signals in accordance with the combination mode to obtain the target tactile signal may include: combining the target basic frequency band tactile signals in the third combination mode to obtain the target tactile signal.

For example, a first target tactile signal can be obtained based on the first combination mode and the target basic band tactile signals. A second target tactile signal can be obtained based on the second combination mode and the target basic band tactile signals. The target tactile signal can be obtained based on the first target tactile signal and the second target tactile signal.

For example, in each of the first combination mode and the second combination mode, all target basic frequency band tactile signals can be combined. For example, the target basic frequency band tactile signals may be a, b, and c, the first target tactile signal can be abc, the second target tactile signal can be acb, and the target tactile signal can be abcacb. Further, the target tactile signal abcacb can be repeated to obtain abcacbabcacb.

For example, the first combination mode (or the second combination mode) can be a mode in which all target basic frequency band tactile signals are combined, and the second combination mode (or the first combination mode) can be a mode in which some of the target basic frequency band tactile signals are combined. For example, the target basic frequency band tactile signals may be a, b, and c, the first target tactile signal can be abc, the second target tactile signal can be ac, and the target tactile signal can be abcac. Further, the target tactile signal abcac can be repeated to obtain abcacabcac.

For example, in the first combination mode (or second combination mode), some of the target basic frequency band tactile signals can be combined, and in the second combination mode (or first combination mode), the remaining target basic frequency band tactile signals can be combined. For example, the target basic frequency band tactile signals may be a, b, and c, the first target tactile signal can be ca, the second target tactile signal can be b, and the target tactile signal can be bca. Further, the target tactile signal bca can be repeated to obtain bcabca.

For example, in the first combination mode (or second combination mode), some of the target basic frequency band tactile signals can be combined, and in the second combination mode (or first combination mode), some of the target basic frequency band tactile signals can be combined. For example, the target basic frequency band tactile signals may be a, b, and c, the first target tactile signal can be ca, the second target tactile signal can be bc, and the target tactile signal can be cabc. Further, the target tactile signal cabc can be repeated to obtain cabccabc.

Figure 4:
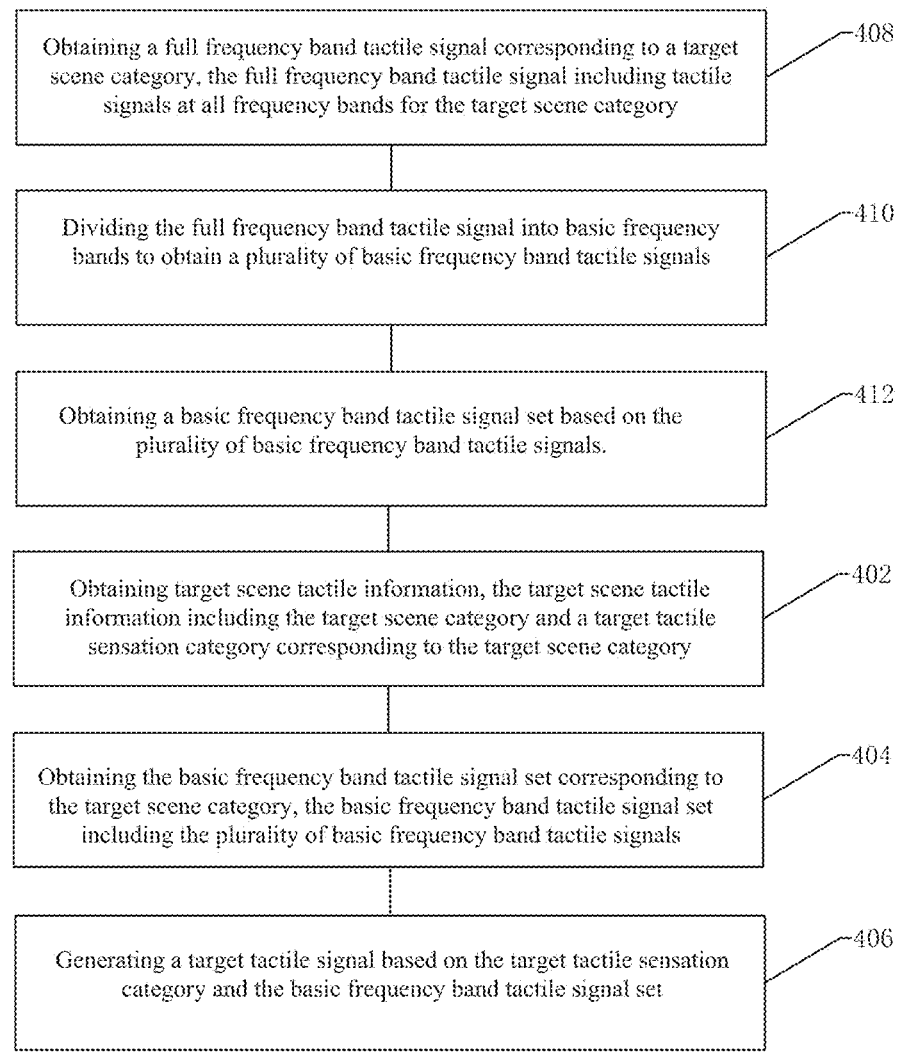
FIG. 4 is a schematic diagram showing an implementation process of a method for tactile signal generation according to an embodiment.

In an embodiment, as shown in FIG. 4, the method may further include the following steps before the step 402 of obtaining the target scene tactile information.

At step 408, a full frequency band tactile signal corresponding to the target scene category is obtained. The full frequency band tactile signal includes tactile signals at all frequency bands for the target scene category.

Here, the full frequency band tactile signal, as shown in FIG. 3, is a tactile signal for the target scene category having a large frequency span that can cover the entire frequency range. It can be a tactile signal with increasing frequencies (such as a sine wave signal), or it can be a collected/synthesized portion of a wide frequency tactile signal. For example, for sound collection, a sound signal from ultra-low frequency to ultra-high frequency can be used as a full frequency band tactile signal. Here, the frequencies corresponding to ultra-low frequency and ultra-high frequency can be determined depending on actual needs and specific application scenarios.

At step 410, the full frequency band tactile signal is divided into basic frequency bands to obtain the plurality of basic frequency band tactile signals.

The division for the basic frequency bands can be performed depending on actual needs and specific application scenarios, to obtain the plurality of basic frequency band tactile signals, as shown in FIG. 3. For example, the division for the basic frequency bands can be performed based on amplitudes. As another example, the division for the basic frequency bands can be performed based on frequency ranges. The full frequency band tactile signal can be divided into low frequency, middle frequency and high frequency, and then the low frequency can be divided into the first low frequency (or middle frequency or high frequency), the second low frequency (or intermediate frequency or high frequency), . . . , the N-th low frequency (or intermediate frequency or high frequency). The duration of the obtained basic frequency band tactile signals can be the same.

At step 412, the basic frequency band tactile signal set is obtained based on the plurality of basic frequency band tactile signals.

The obtained basic frequency band tactile signals constitute the basic frequency band tactile signal set.

Figure 5:
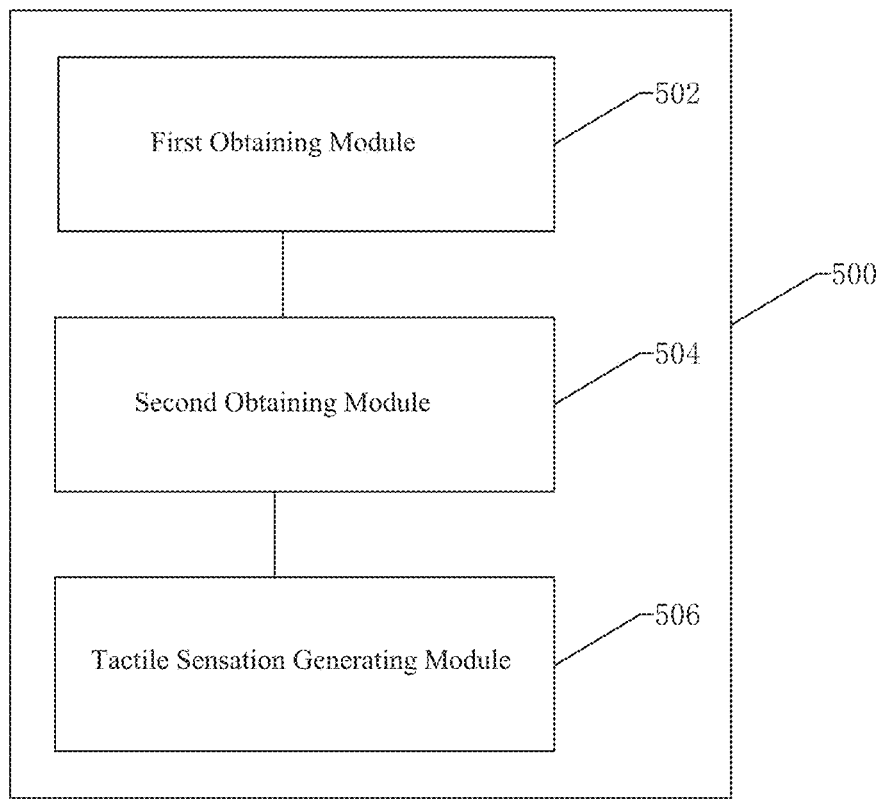
FIG. 5 is a block diagram showing a structure of an apparatus for tactile signal generation according to an embodiment.

As shown in FIG. 5, an apparatus 500 for tactile signal generation is provided. In particular, the apparatus 500 includes: a first obtaining module 502 configured to obtain target scene tactile information, the target scene tactile information including a target scene category and a target tactile sensation category corresponding to the target scene category; a second obtaining module 504 configured to obtain a basic frequency band tactile signal set corresponding to the target scene category, the basic frequency band tactile signal set including a plurality of basic frequency band tactile signals, and a tactile sensation generating module 506 configured to generate a target tactile signal based on the target tactile sensation category and the basic frequency band tactile signal set.

According to the above-described apparatus for tactile signal generation, first, target scene tactile information is obtained. The target scene tactile information includes a target scene category and a target tactile sensation category corresponding to the target scene category. Then, a basic frequency band tactile signal set corresponding to the target scene category is obtained. The basic frequency band tactile signal set includes a plurality of basic frequency band tactile signals. Finally, a target tactile signal is generated based on the target tactile sensation category and the basic frequency band tactile signal set. It can be seen that, in this way, since the basic frequency band tactile signal set is obtained and the basic frequency band tactile signal set includes at least one basic frequency band tactile signal corresponding to the target scene category, a target tactile sensation can be generated based on the target tactile sensation category and the basic frequency band tactile signal set, such that the generation of the target tactile sensation can be more flexible and diverse, without having to rely on a few pre-stored tactile sensations. Further, compared with a few pre-stored tactile sensations, more target tactile sensations can be provided. Meanwhile, as only basic frequency band tactile signals need to be stored, the storage space can also be reduced to some extent.

In an embodiment, the tactile sensation generating module 506 may include: a target signal obtaining module configured to obtain, from the basic frequency band tactile signal set, target basic frequency band tactile signals corresponding to the target tactile sensation category; a combination mode determining module configured to determine a combination mode for the target basic frequency band tactile signals based on the target tactile sensation category; and a signal combining and generating module configured to combine the target basic frequency band tactile signals in accordance with the combination mode to obtain the target tactile signal.

In an embodiment, the combination mode may include a first combination mode in which basic frequency band tactile signals having same amplitudes are combined. The signal combining and generating module may include: a same-amplitude combining module configured to combine target basic frequency band tactile signals having same amplitudes in the first combination mode to obtain the target tactile signal. In an embodiment, the first combination mode may include a single-signal single-amplitude mode in which a plurality of same basic frequency band tactile signals are combined. The same-amplitude combining module may include: a single-signal same-amplitude combining module configured to combine a plurality of same target basic frequency band tactile signals in the single-signal single-amplitude mode to obtain the target tactile signal.

In an embodiment, the combination mode may include a second combination mode in which basic frequency band tactile signals having different amplitudes are combined. The signal combining and generating module may include: a multi-amplitude combining module configured to combine target basic frequency band tactile signals having different amplitudes in the second combination mode to obtain the target tactile signal.

In one embodiment, the second combination mode may include a single-signal multi-amplitude mode in which single basic frequency band tactile signals having different amplitudes are combined. The multi-amplitude combining module may include: an amplitude changing module configured to change a signal amplitude of the single target basic frequency band tactile signal to obtain a single-signal multi-amplitude set including tactile signals having different signal amplitudes; and a single-signal multi-amplitude combining module configured to obtain the target tactile signal based on the single-signal multi-amplitude mode and the single-signal multi-amplitude set.

In an embodiment, the apparatus 500 may further include: a full frequency band obtaining module configured to obtain a full frequency band tactile signal corresponding to the target scene category, the full frequency band tactile signal including tactile signals at all frequency bands for the target scene category; a full frequency band dividing module configured to divide the full frequency band tactile signal into basic frequency bands to obtain the plurality of basic frequency band tactile signals; and a basic set determining module configured to obtain the basic frequency band tactile signal set based on the plurality of basic frequency band tactile signals.

Figure 6:
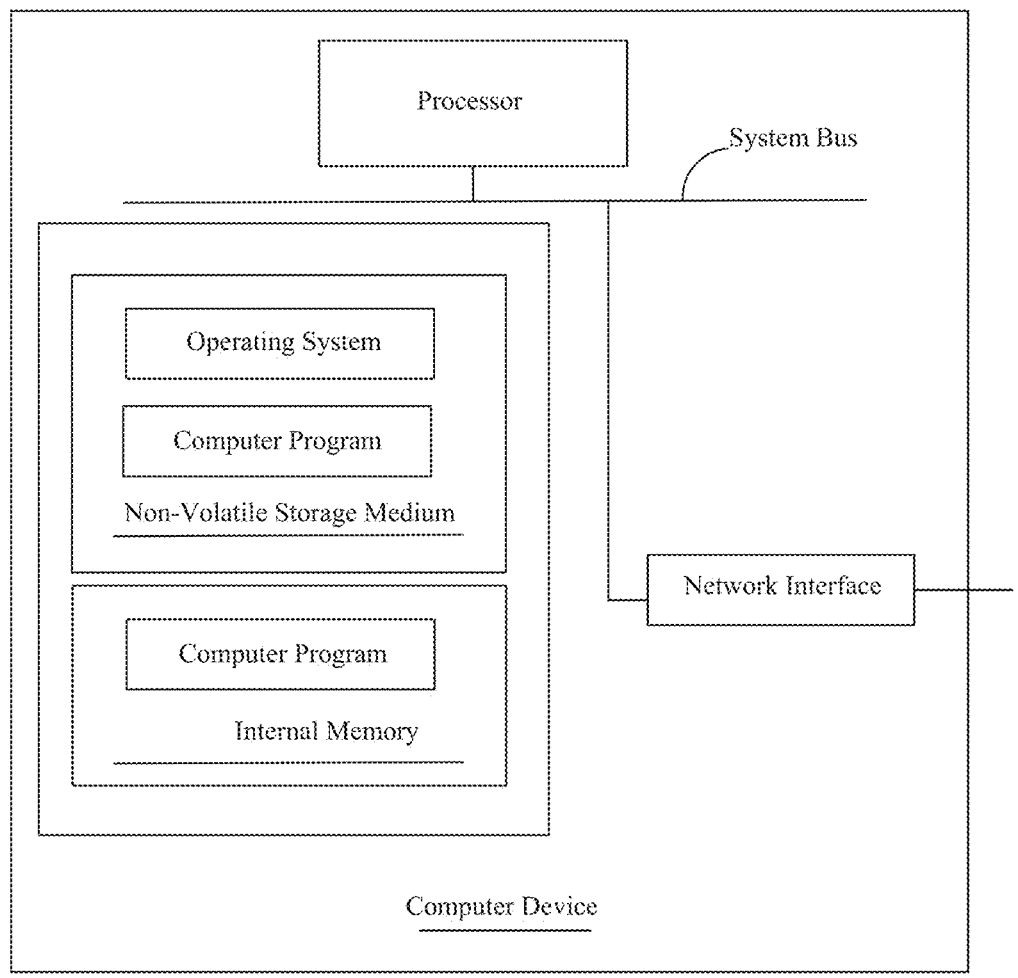
FIG. 6 is a block diagram showing a structure of a computer device according to an embodiment.

FIG. 6 shows an internal structure diagram of a computer device according to an embodiment. Specifically, the computer device may be a server and a terminal. As shown in FIG. 6, the computer device includes a processor, a memory, and a network interface connected via a system bus. Here, the memory includes a non-volatile storage medium and an internal memory. The non-volatile storage medium of the computer device stores an operating system, and may also store a computer program. When executed by the processor, the computer program may cause the processor to implement a method for tactile signal generation. The computer program may also be stored in the internal memory. When executed by the processor, the computer program may cause the processor to execute the method for tactile signal generation. Those skilled in the art can understand that the structure shown in FIG. 6 is only a block diagram of a part of the structure that is related to the solution of the present invention, and does not constitute a limitation on the computer device to which the solution of the present invention can be applied. The specific computer device may include more or fewer components than those shown in the figure, or some components may be combined, or have a different component arrangement.

In an embodiment, the method for tactile signal generation according to the present invention may be implemented in the form of a computer program. The computer program may run on a computer device as shown in FIG. 6. Various program templates constituting the apparatus for tactile signal generation can be stored in the memory of the computer device, e.g., the first obtaining module 502, the second obtaining module 504, and the tactile sensation generating module 506.

A computer device includes a memory and a processor. The memory stores a computer program which, when executed by the processor, causes the processor to perform steps of: obtaining target scene tactile information, the target scene tactile information including a target scene category and a target tactile sensation category corresponding to the target scene category; obtaining a basic frequency band tactile signal set corresponding to the target scene category, the basic frequency band tactile signal set including a plurality of basic frequency band tactile signals, and generating a target tactile signal based on the target tactile sensation category and the basic frequency band tactile signal set.

In an embodiment, the step of generating the target tactile signal based on the target tactile sensation category and the basic frequency band tactile signal set may include: obtaining, from the basic frequency band tactile signal set, target basic frequency band tactile signals corresponding to the target tactile sensation category; determining a combination mode for the target basic frequency band tactile signals based on the target tactile sensation category; and combining the target basic frequency band tactile signals in accordance with the combination mode to obtain the target tactile signal.

In an embodiment, the combination mode may include a first combination mode in which basic frequency band tactile signals having same amplitudes are combined. The step of combining the target basic frequency band tactile signals in accordance with the combination mode to obtain the target tactile signal may include: combining target basic frequency band tactile signals having same amplitudes in the first combination mode to obtain the target tactile signal.

In an embodiment, the first combination mode may include a single-signal single-amplitude mode in which a plurality of same basic frequency band tactile signals are combined. The step of combining the target basic frequency band tactile signals having the same amplitudes in the first combination mode to obtain the target tactile signal may include: combining a plurality of same target basic frequency band tactile signals in the single-signal single-amplitude mode to obtain the target tactile signal.

In an embodiment, the combination mode may include a second combination mode in which basic frequency band tactile signals having different amplitudes are combined. The step of combining the target basic frequency band tactile signals in accordance with the combination mode to obtain the target tactile signal may include: combining target basic frequency band tactile signals having different amplitudes in the second combination mode to obtain the target tactile signal.

In an embodiment, the second combination mode may include a single-signal multi-amplitude mode in which single basic frequency band tactile signals having different amplitudes are combined. The step of combining the target basic frequency band tactile signals having the different amplitudes in the second combination mode to obtain the target tactile signal may include: changing a signal amplitude of the single target basic frequency band tactile signal to obtain a single-signal multi-amplitude set including tactile signals having different signal amplitudes; and obtaining the target tactile signal based on the single-signal multi-amplitude mode and the single-signal multi-amplitude set.

In an embodiment, the computer program, when executed by the processor, may further cause the processor to, prior to obtaining the target scene tactile information: obtain a full frequency band tactile signal corresponding to the target scene category, the full frequency band tactile signal including tactile signals at all frequency bands for the target scene category; dividing the full frequency band tactile signal into basic frequency bands to obtain the plurality of basic frequency band tactile signals; and obtaining the basic frequency band tactile signal set based on the plurality of basic frequency band tactile signals.

In an embodiment, a computer readable storage medium is provided. The computer readable storage medium stores a computer program which, when executed by a processor, causes the processor to perform steps of: obtaining target scene tactile information, the target scene tactile information including a target scene category and a target tactile sensation category corresponding to the target scene category; obtaining a basic frequency band tactile signal set corresponding to the target scene category, the basic frequency band tactile signal set including a plurality of basic frequency band tactile signals, and generating a target tactile signal based on the target tactile sensation category and the basic frequency band tactile signal set.

In an embodiment, the step of generating the target tactile signal based on the target tactile sensation category and the basic frequency band tactile signal set may include: obtaining, from the basic frequency band tactile signal set, target basic frequency band tactile signals corresponding to the target tactile sensation category; determining a combination mode for the target basic frequency band tactile signals based on the target tactile sensation category; and combining the target basic frequency band tactile signals in accordance with the combination mode to obtain the target tactile signal.

In an embodiment, the combination mode may include a first combination mode in which basic frequency band tactile signals having same amplitudes are combined. The step of combining the target basic frequency band tactile signals in accordance with the combination mode to obtain the target tactile signal may include: combining target basic frequency band tactile signals having same amplitudes in the first combination mode to obtain the target tactile signal.

In an embodiment, the first combination mode may include a single-signal single-amplitude mode in which a plurality of same basic frequency band tactile signals are combined. The step of combining the target basic frequency band tactile signals having the same amplitudes in the first combination mode to obtain the target tactile signal may include: combining a plurality of same target basic frequency band tactile signals in the single-signal single-amplitude mode to obtain the target tactile signal.

In an embodiment, the combination mode may include a second combination mode in which basic frequency band tactile signals having different amplitudes are combined. The step of combining the target basic frequency band tactile signals in accordance with the combination mode to obtain the target tactile signal may include: combining target basic frequency band tactile signals having different amplitudes in the second combination mode to obtain the target tactile signal.

In an embodiment, the second combination mode may include a single-signal multi-amplitude mode in which single basic frequency band tactile signals having different amplitudes are combined. The step of combining the target basic frequency band tactile signals having the different amplitudes in the second combination mode to obtain the target tactile signal may include: changing a signal amplitude of the single target basic frequency band tactile signal to obtain a single-signal multi-amplitude set including tactile signals having different signal amplitudes; and obtaining the target tactile signal based on the single-signal multi-amplitude mode and the single-signal multi-amplitude set.

In an embodiment, the computer program, when executed by the processor, may further cause the processor to, prior to obtaining the target scene tactile information: obtain a full frequency band tactile signal corresponding to the target scene category, the full frequency band tactile signal including tactile signals at all frequency bands for the target scene category; dividing the full frequency band tactile signal into basic frequency bands to obtain the plurality of basic frequency band tactile signals; and obtaining the basic frequency band tactile signal set based on the plurality of basic frequency band tactile signals.

It should be noted that the above-described method and apparatus for tactile signal generation, computer device and computer readable storage medium belong to a general inventive concept. The content described in connection with the method and apparatus for tactile signal generation, the computer device and the computer readable storage medium can be applicable to each other. Those of ordinary skill in the art can understand that all or part of the process flows in the method of the above embodiments may be implemented by relevant hardware following instructions of a computer program. The program may be stored in a non-volatile computer readable storage medium. When executed, it program may include the process flows of the embodiments of the above methods. As used herein, any reference to a memory, storage, database or other medium in the embodiments according to the present invention may include a non-volatile memory and/or a volatile memory. The non-volatile memory may include a Read-Only Memory (ROM), a Programmable ROM (PROM), an Electrically Programmable ROM (EPROM), an Electrically Erasable Programmable ROM (EEPROM), or a flash memory. The volatile memory can include a Random Access Memory (RAM) or an external cache memory. For the purpose of non-limiting illustration, a RAM may be available in many forms, such as Static RAM (SRAM), Dynamic RAM (DRAM), Synchronous DRAM (SDRAM), Double Data Rate SDRAM (DDRSDRAM), Enhanced SDRAM (ESDRAM), Synchronous Chain (Synchlink) DRAM (SLDRAM), memory bus (Rambus) direct RAM (RDRAM), Direct Memory Bus Dynamic RAM (DRDRAM), and memory bus dynamic RAM (RDRAM), etc. The technical features of the above embodiments can be arbitrarily combined. To simplify the description, not all possible combinations of the technical features in the above embodiments are described. However, as long as there is no conflict in the combination of these technical features, such combination is considered to fall within the scope described in this specification. The above are only the embodiments of the present invention. It should be pointed out that those of ordinary skill in the art can make improvements without departing from the inventive concept of the present invention, and these improvements fall within the scope of the present invention.

What is claimed is:

1. A method for tactile signal generation, comprising:
    obtaining target scene tactile information, the target scene tactile information comprising a target scene category and a target tactile sensation category corresponding to the target scene category;
    obtaining a basic frequency band tactile signal set corresponding to the target scene category, the basic frequency band tactile signal set comprising a plurality of basic frequency band tactile signals, and
    generating a target tactile signal based on the target tactile sensation category and the basic frequency band tactile signal set.

2. The method as described in claim 1, wherein said generating the target tactile signal based on the target tactile sensation category and the basic frequency band tactile signal set comprises:
    obtaining, from the basic frequency band tactile signal set, target basic frequency band tactile signals corresponding to the target tactile sensation category;
    determining a combination mode for the target basic frequency band tactile signals based on the target tactile sensation category; and
    combining the target basic frequency band tactile signals in accordance with the combination mode to obtain the target tactile signal.

3. The method as described in claim 2, wherein the combination mode comprises a first combination mode in which basic frequency band tactile signals having same amplitudes are combined, and said combining the target basic frequency band tactile signals in accordance with the combination mode to obtain the target tactile signal comprises: combining target basic frequency band tactile signals having same amplitudes in the first combination mode to obtain the target tactile signal.

4. The method as described in claim 3, wherein the first combination mode comprises a single-signal single-amplitude mode in which a plurality of same basic frequency band tactile signals are combined, and said combining the target basic frequency band tactile signals having the same amplitudes in the first combination mode to obtain the target tactile signal comprises: combining a plurality of same target basic frequency band tactile signals in the single-signal single-amplitude mode to obtain the target tactile signal.

5. The method as described in claim 2, wherein the combination mode comprises a second combination mode in which basic frequency band tactile signals having different amplitudes are combined, and said combining the target basic frequency band tactile signals in accordance with the combination mode to obtain the target tactile signal comprises: combining target basic frequency band tactile signals having different amplitudes in the second combination mode to obtain the target tactile signal.

6. The method as described in claim 5, wherein the second combination mode comprises a single-signal multi-amplitude mode in which single basic frequency band tactile signals having different amplitudes are combined, and said combining the target basic frequency band tactile signals having the different amplitudes in the second combination mode to obtain the target tactile signal comprises: changing a signal amplitude of the single target basic frequency band tactile signal to obtain a single-signal multi-amplitude set comprising tactile signals having different signal amplitudes; and obtaining the target tactile signal based on the single-signal multi-amplitude mode and the single-signal multi-amplitude set.

7. The method as described in claim 1, further comprising, prior to obtaining the target scene tactile information:
    obtaining a full frequency band tactile signal corresponding to the target scene category, the full frequency band tactile signal comprising tactile signals at all frequency bands for the target scene category;
    dividing the full frequency band tactile signal into basic frequency bands to obtain the plurality of basic frequency band tactile signals; and
    obtaining the basic frequency band tactile signal set based on the plurality of basic frequency band tactile signals.

8. An apparatus for tactile signal generation, comprising:
a first obtaining module configured to obtain target scene tactile information, the target scene tactile information comprising a target scene category and a target tactile sensation category corresponding to the target scene category;
a second obtaining module configured to obtain a basic frequency band tactile signal set corresponding to the target scene category, the basic frequency band tactile signal set comprising a plurality of basic frequency band tactile signals, and
a tactile sensation generating module configured to generate a target tactile signal based on the target tactile sensation category and the basic frequency band tactile signal set.

9. A computer device, comprising a memory, a processor, and a computer program stored in the memory and executable by the processor, wherein the processor is operative to, when executing the computer program, perform the steps of the method for tactile signal generation as described in claim 1.

10. A computer readable storage medium, storing a computer program which, when executed by a processor, causes the processor to perform the steps of the method for tactile signal generation as described in claim 1.

* * * * *